United States Patent
Suzuki et al.

(10) Patent No.: US 11,655,046 B2
(45) Date of Patent: May 23, 2023

(54) SAFETY MANAGEMENT SYSTEM FOR AIRCRAFT

(71) Applicants: The University of Tokyo, Tokyo (JP); BLUE INNOVATION Co., Ltd., Tokyo (JP)

(72) Inventors: Shinji Suzuki, Tokyo (JP); Takeshi Tsuchiya, Tokyo (JP); Masayuki Kumada, Tokyo (JP)

(73) Assignees: The University of Tokyo, Tokyo (JP); Blue Innovation Co., Ltd., Tokyo (JP)

( * ) Notice: Subject to any disclaimer, the term of this patent is extended or adjusted under 35 U.S.C. 154(b) by 834 days.

(21) Appl. No.: 15/568,136

(22) PCT Filed: Apr. 21, 2016

(86) PCT No.: PCT/JP2016/062667
§ 371 (c)(1),
(2) Date: Oct. 20, 2017

(87) PCT Pub. No.: WO2016/171222
PCT Pub. Date: Oct. 27, 2016

(65) Prior Publication Data
US 2018/0141676 A1 May 24, 2018

(30) Foreign Application Priority Data
Apr. 21, 2015 (JP) .............................. JP2015-087149

(51) Int. Cl.
*B64D 45/00* (2006.01)
*B64D 27/24* (2006.01)
(Continued)

(52) U.S. Cl.
CPC .............. *B64D 45/00* (2013.01); *B64C 39/02* (2013.01); *B64C 39/024* (2013.01); *B64D 27/24* (2013.01);
(Continued)

(58) Field of Classification Search
CPC ...... B64D 45/00; B64D 27/24; B64C 39/024; B64C 2201/108; B64C 2201/042;
(Continued)

(56) References Cited

U.S. PATENT DOCUMENTS 9,376,208 B1 * 6/2016 Gentry .................. B64C 39/024
9,412,278 B1 * 8/2016 Gong ...................... G06F 16/29
(Continued)

FOREIGN PATENT DOCUMENTS

JP 2004-291805 A 10/2004
JP 2006-1487 A 1/2006
(Continued)

OTHER PUBLICATIONS

WO 2016/154949A1, Gong, Ming, Mar. 31, 2015 (Year: 2015).*
International Search Report, International Patent Application No. PCT/JP2016/062667, dated Jul. 12, 2016 (4 pages).

*Primary Examiner* — Jeff A Burke
*Assistant Examiner* — Kyle T Johnson
(74) *Attorney, Agent, or Firm* — Hamre, Schumann, Mueller & Larson, P.C.

(57) ABSTRACT

A safety management system to prevent unauthorized use, accident, resale, theft, and so forth of a flying object. The safety management system includes changing, at a motor controller, a power feeding amount to each drive unit based on an instruction from a main control unit, an authentication information storage unit which records registered identification information for performing operator authentication, an authentication accepting unit which accepts an input of input identification information, an operator authentication unit which performs operator authentication of an operator of the flying object based on the input identification information and the registered identification information, and a safety managing unit connected between a power source of the flying object and the motor controller of the flying (Continued)

object. The safety managing unit includes a switch which controls electrical connection between the motor controller and the power source based on the result of the operator authentication.

4 Claims, 7 Drawing Sheets (51) Int. Cl.
*G06F 21/31* (2013.01)
*G06F 21/44* (2013.01)
*G06F 21/85* (2013.01)
*B64C 39/02* (2023.01)
*B64U 10/13* (2023.01)
*B64U 30/20* (2023.01)
*B64U 50/19* (2023.01)
*G06F 21/62* (2013.01)

(52) U.S. Cl.
CPC .............. *G06F 21/31* (2013.01); *G06F 21/44* (2013.01); *G06F 21/6218* (2013.01); *G06F 21/85* (2013.01); *B64U 10/13* (2023.01); *B64U 30/20* (2023.01); *B64U 50/19* (2023.01)

(58) Field of Classification Search
CPC .............. B64C 2201/027; B64C 39/02; G06F 21/6218; G06F 21/31; G06F 21/85; G06F 21/44
See application file for complete search history.

(56) References Cited

U.S. PATENT DOCUMENTS

| | | | | |
|---|---|---|---|---|
| 9,524,648 | B1* | 12/2016 | Gopalakrishnan | H04K 3/224 |
| 2001/0056544 | A1* | 12/2001 | Walker | B60R 25/042 |
| | | | | 726/2 |
| 2004/0075018 | A1* | 4/2004 | Yamane | G05D 1/0676 |
| | | | | 244/17.13 |
| 2013/0083926 | A1* | 4/2013 | Hughes | H04L 9/08 |
| | | | | 380/278 |
| 2014/0223573 | A1* | 8/2014 | Reedy | H04L 63/0428 |
| | | | | 726/26 |
| 2015/0035437 | A1* | 2/2015 | Panopoulos | H05B 47/105 |
| | | | | 315/112 |
| 2016/0200421 | A1* | 7/2016 | Morrison | G05D 1/0077 |
| | | | | 244/17.23 |
| 2017/0129603 | A1* | 5/2017 | Raptopoulos | B64C 39/024 |
| 2017/0248969 | A1* | 8/2017 | Ham | G08G 5/0069 |
| 2017/0286708 | A1* | 10/2017 | Erhart | G06F 21/6218 |
| 2017/0366026 | A1* | 12/2017 | Todd | G06K 9/00006 |
| 2018/0026404 | A1* | 1/2018 | Geo | H04W 88/04 |
| | | | | 439/620.21 |
| 2018/0068567 | A1* | 3/2018 | Gong | G08G 5/0078 |
| 2018/0141676 | A1* | 5/2018 | Suzuki | G06F 21/31 |

FOREIGN PATENT DOCUMENTS

| | | | |
|---|---|---|---|
| JP | 2006-172502 A | 6/2006 | |
| JP | 2008-105591 A | 5/2008 | |
| JP | 2010-92498 A | 4/2010 | |
| JP | 2016-37108 A | 3/2016 | |
| WO | WO-2016154949 A1 * | 10/2016 | ............ G06F 16/29 |

* cited by examiner

SAFETY MANAGEMENT SYSTEM FOR AIRCRAFT

TECHNICAL FIELD

The present invention relates to a safety management system for a flying object to perform control as to whether to enable or disable a flight of a flying object based on authentication.

BACKGROUND ART

Conventionally, uncrewed flying objects without a human on board have been mainly used for purposes as toys. In recent years, however, the flying objects have been used for various purposes, such as agrochemical spraying, aerial photography, inspection at high places, transportation, and so forth. These flying objects have been actively developed at various places, and are considered to become increasingly demanded in the future.

Examples of this flying object include one flying by reflecting an operation signal inputted via wireless communication on a real-time basis, one making an autonomous flight based on route information set in advance, and one including both of these, and so forth. With an increase in demand for this flying object, an accident, theft, and so forth of the flying object are perceived as problems.

As a conventional system, a management system has been known in which whether a flying object is within a flying range registered in advance or within a use period set in advance is determined by a control unit of the flying object at the time of use of the flying object to control a flight enabled/disabled state (PTL 1). Also described is a technique in which the system checks, at the control unit, ID data inputted by a user against ID data registered in advance to control the flight enabled/disabled state. This system can prevent resale, theft, unauthorized use by a third party, and so forth of the flying object. Also, by updating the use period at the time of inspection of the flying object, it is possible to prompt an operator to regularly conduct an inspection, thereby limiting a flight of an unmaintained flying object.

CITATION LIST

Patent Literatures

PTL 1: Japanese Patent Application Laid-Open No. 2004-291805

SUMMARY OF INVENTION

Technical Problem

However, the conventional system does not prevent dangerous or prohibited operation by the owner of the flying object himself or herself. In the future, with widespread use of flying objects, it is feared that accidents of the flying objects will increase, and dangerous operations and so forth by the operators of the flying objects are desired to be inhibited. Also, with widespread use of flying objects making an autonomous flight, it is also feared that accidents between the flying objects making autonomous flights will occur.

In addition, it is not easy to configure control means regarding the flight enabled/disabled state in a main control unit of the flying object as software. Thus, it is not practical to provide check means as described in the literature individually to each of already-operating flying objects.

The present invention was made in view of the above-described circumstances, and is to provide a safety management system which can be easily provided to an existing flying object to prevent unauthorized use, accident, resale, theft, and so forth.

Solution to Problem

To solve the above problem, the invention is directed to a safety management system for a flying object, the system performing flight control by changing, at a motor controller, a power feeding amount to each drive unit based on an instruction from a main control unit, and the system including an authentication information storage unit which records registered identification information for performing operator authentication, authentication accepting means which accepts an input of input identification information, operator authentication means which performs operator authentication of an operator of the flying object based on the input identification information and the registered identification information, and a safety management device connected between a power source of the flying object and the motor controller of the flying object, wherein the safety management device includes switching means which switches an electrical connection state between the motor controller and the power source based on the result of the operator authentication.

With this structure, a flight enabled/disabled state of the flying object can be easily changed without depending on control by the main control unit. Also, by physically limiting supply of electric power to the motor controller, execution of flight can be disabled, while execution of various controls at the main control unit is enabled.

In a preferred mode of the present invention, the system further includes a management server including a route information storage unit which stores registered route information on which an autonomous flight schedule of the flying object is registered, in association with identification information about the operator of the flying object, and route authentication means which performs autonomous flight enabled/disabled authentication based on the identification information about the operator associated with the registered route information and the input identification information, wherein the switching means switches the electrical connection state between the motor controller and the power source based on the results of the operator authentication and the enabled/disabled authentication.

With this structure, based on the registered route information, launching an autonomous flight can be prevented when a disaster occurs near the registered route, when the registered area is in inclement weather, or the like, thereby making it possible to prevent an accident at the time of an autonomous flight. Also, by causing flight route information to be inputted to the management server prior to an autonomous flight, a flying object for making an autonomous flight can be grasped.

In a preferred mode of the present invention, the safety management device includes flight recording means which records flight history information in flight.

With this structure, use of the flying object for an illegal purpose can be inhibited. Also, the cause of an accident occurring at the time of an autonomous flight of the flying object can be clarified.

In a preferred mode of the present invention, the safety management device includes history output means which outputs the flight history information recorded by the fight recording means to the management server via a network.

With this structure, the flight history information can be collected onto the management server.

In a preferred mode of the present invention, the history output means outputs the flight history information after the authentication by the operator authentication means is successful.

With this structure, the flight history information can be linked to the information about the authenticated operator. By linking the information about the operator and the flight history information for management, the flight history information can be more effectively utilized.

In a preferred mode of the present invention, communication from the safety management device via the network is encrypted based on encryption information which the input identification information has.

With this structure, communication to the network with enhanced security characteristics can be provided.

The present invention is directed to a safety management device for a flying object, the device performing flight control by changing, at a motor controller, a power feeding amount to each drive unit based on an instruction from a main control unit, the device including an authentication information storage unit which records registered identification information for performing operator authentication, authentication accepting means which accepts an input of input identification information, operator authentication means which performs operator authentication of an operator of the flying object based on the input identification information and the registered identification information, and switching means which switches an electrical connection state between the motor controller and a power source of the flying object based on the result of the operator authentication.

The present invention is directed to a safety management program for a flying object, the program performing flight control by changing, at a motor controller, a power feeding amount to each drive unit based on an instruction from a main control unit, the program causing a computer to function as authentication accepting means which accepts input identification information for performing operation authentication, operator authentication means which performs operator authentication of an operator of the flying object based on registered identification information acquired from an authentication information storage unit and the input identification information, and switching means which switches an electrical connection state between the motor controller and a power source of the flying object based on the result of the operator authentication.

The present invention is directed to a management server which performs flight enabled/disabled authentication of a flying object, the management server including a route information storage unit which stores registered route information on which an autonomous flight schedule of the flying object is registered, in association with identification information about an operator of the flying object, authentication accepting means which accepts an input of input identification information, and route authentication means which performs autonomous flight enabled/disabled authentication for the flying object based on the identification information about the operator associated with the registered route information and the input identification information.

Advantageous Effects of Invention

According to the present invention, it is possible to provide a safety management system which can be easily provided to an existing flying object to prevent unauthorized use, accident, resale, theft, and so forth.

DESCRIPTION OF EMBODIMENT

In the following, as for an embodiment of the present invention, the flying object safety management system according to one embodiment of the present invention is described by using FIG. 1 to FIG. 7. Note that the embodiment described below is merely an example of the present invention and the present invention is not limited to the following embodiment. While the structure, operation, and so forth of the safety management system are described in the present embodiment, a method, device, computer program, recording medium, and so forth of a similar structure can also exert similar operations and effects. Also, the program may be stored in a recording medium. Here, the recording medium having the program stored therein may be a non-transitory computer readable medium, for example, a CD-ROM or the like.

Figure 1:
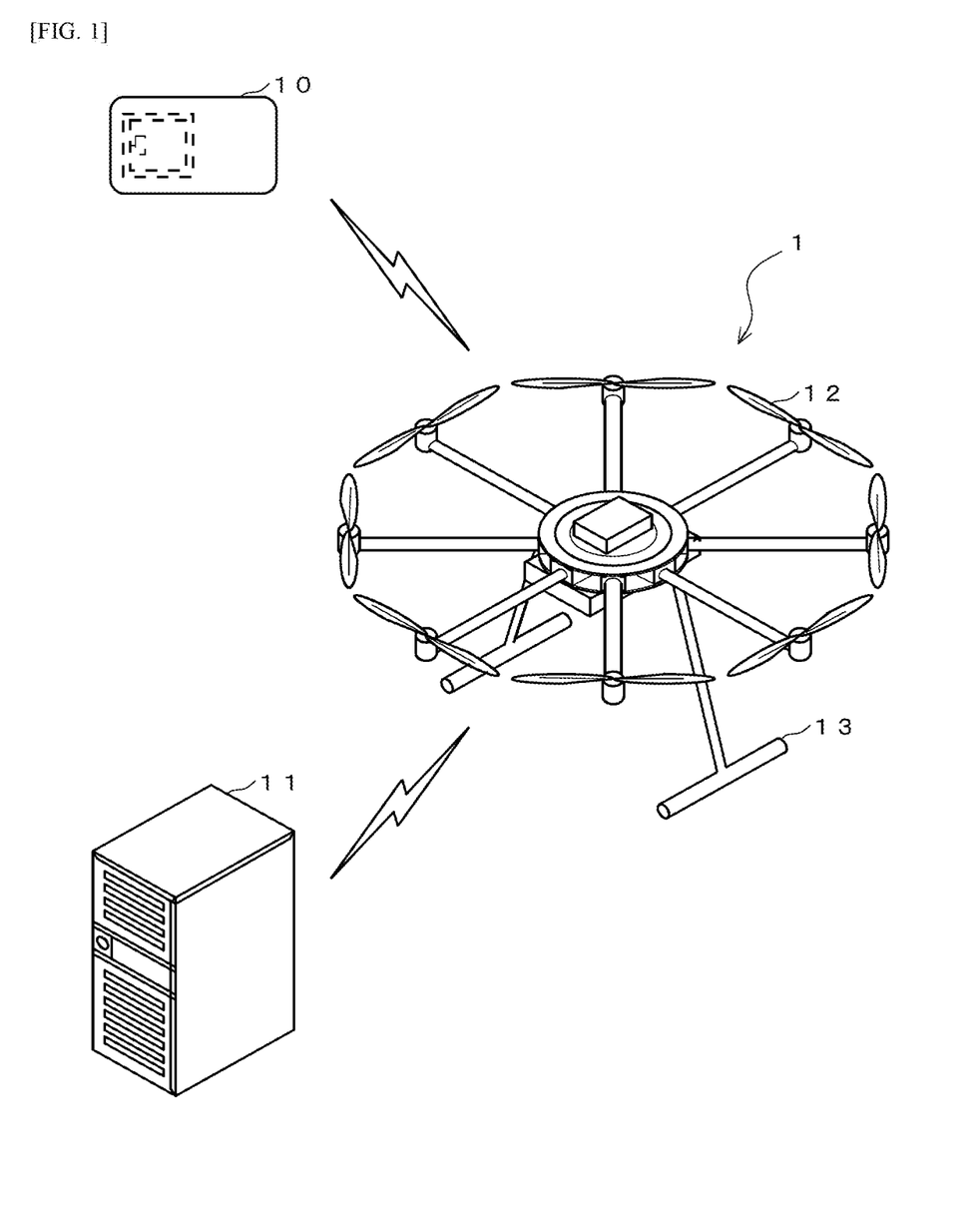
FIG. 1 is a diagram depicting a safety management system according to one embodiment of the present invention.

FIG. 1 is a diagram depicting the entire safety management system according to the present embodiment. A sign 1 denotes a flying object, a sign 10 denotes an authentication device having identification information about an operator recorded thereon, a sign 11 denotes a management server for use in authentication process and collection of flight history information, a sign 12 denotes a wing part of the flying object 1, and a sign 13 denotes a leg part of the flying object 1 which makes contact with the ground at the time of liftoff and landing. The management server 11 includes an arithmetic device (CPU), a main storage device (RAM), an auxiliary storage device such as an HDD, SSD, flash memory, various input/output devices including connecting means to a network, and so forth.

In the present embodiment, the authentication device 10 having the identification information about the operator recorded thereon to input the identification information about the operator via non-contact wireless communication is exemplarily described as a card-type IC-mounted device (contactless IC card), but this embodiment is not restrictive. As the authentication device 10, a portable terminal or the like having an IC for performing non-contact communication mounted thereon can be used. Also, in place of the authentication device 10, a configuration may be adopted in which information is outputted by performing short-distance wireless communication such as Bluetooth (registered trademark) from a portable terminal or the like. In the drawing, the flying object 1 includes eight wing parts 12, but the number of wing parts 12 and the shape of the flying object 1 are not particularly limited.

Figure 2:
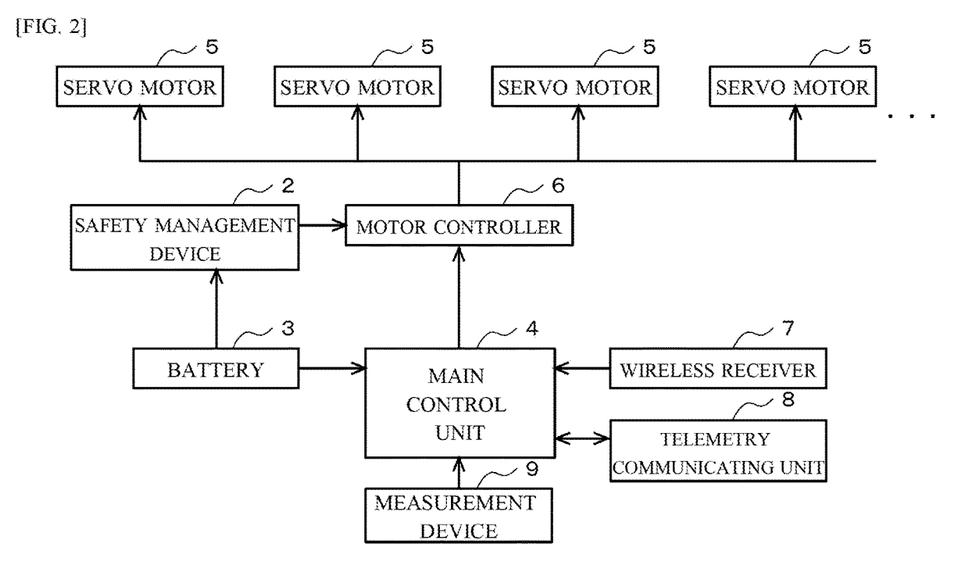
FIG. 2 is a functional block diagram of a flying object according to one embodiment of the present invention.

FIG. 2 is a functional block diagram of the flying object 1. The flying object 1 includes a safety management device 2 which controls a flight-enabled/disabled state of the flying object, a battery 3 (power source) which supplies electric power for use in the flying object 1, a main control unit 4 which performs control over the flying operation of the flying object 1 and so forth, servo motors 5 which drive the wing parts 12, a motor controller 6 which adjusts a power feeding amount to the servo motor 5 based on a signal from the main control unit 4, a wireless receiver 7 which receives an operation signal from an operation terminal operated by the operator, a telemetry communicating unit 8 which performs communication between an external terminal such as the operation terminal or another terminal and the flying object 1, and a measurement device 9 for acquiring status information such as a current location and speed of the flying object 1.

Normally, the general flying object 1 is not provided with the safety management device 2, and supply of electric power from the battery 3 is directly performed to the main control unit 4 and the motor controller 6. Supply of electric power to the telemetry communicating unit 8, the measurement device 9, and so forth may be performed directly from the battery 3 or, as in the present embodiment, may be performed via the main control unit 4. Note that supply of electric power may be performed from the motor controller 6 depending on the specifications of the main control unit 4.

Operation control over the flying object 1 is performed by the main control unit 4. The main control unit 4 receives an operation signal inputted by the operation terminal of the operator via the wireless receiver 7. To cause the flying object 1 to achieve a behavior corresponding to the input operation signal, the main control unit 4 receiving the operation signal gives an instruction to the motor controller 6 to change the power feeding amount to each servo motor 5. The motor controller 6 receiving this change instruction changes the power feeding amount from the battery 3 to each servo motor 5 in accordance with the change instruction to change the operation of each servo motor 5. This causes the flying object 1 to operate based on the operation signal inputted by the operator.

The flying object 1 uses the telemetry communicating unit 8 and the measurement device 9 to output various information to the external terminal. For example, information about the remaining amount of the battery 3, GPS information acquired by the measurement device 9, and status information about the flying object 1 such as speed information and altitude information are outputted to the external terminal.

Also, with route information inputted to the main control unit 4 in advance via the telemetry communicating unit 8, the flying object 1 performs an autonomous flight. The main control unit 4 issues a change instruction to the motor controller 6 based on the status information acquired by the measurement device 9 and the route information to allow the flying object 1 to perform an autonomous flight. Here, the route information inputted in advance to the main control unit 4 is preferably processed to be registered on a management server as registered route information, as will be described further below.

Figure 3:
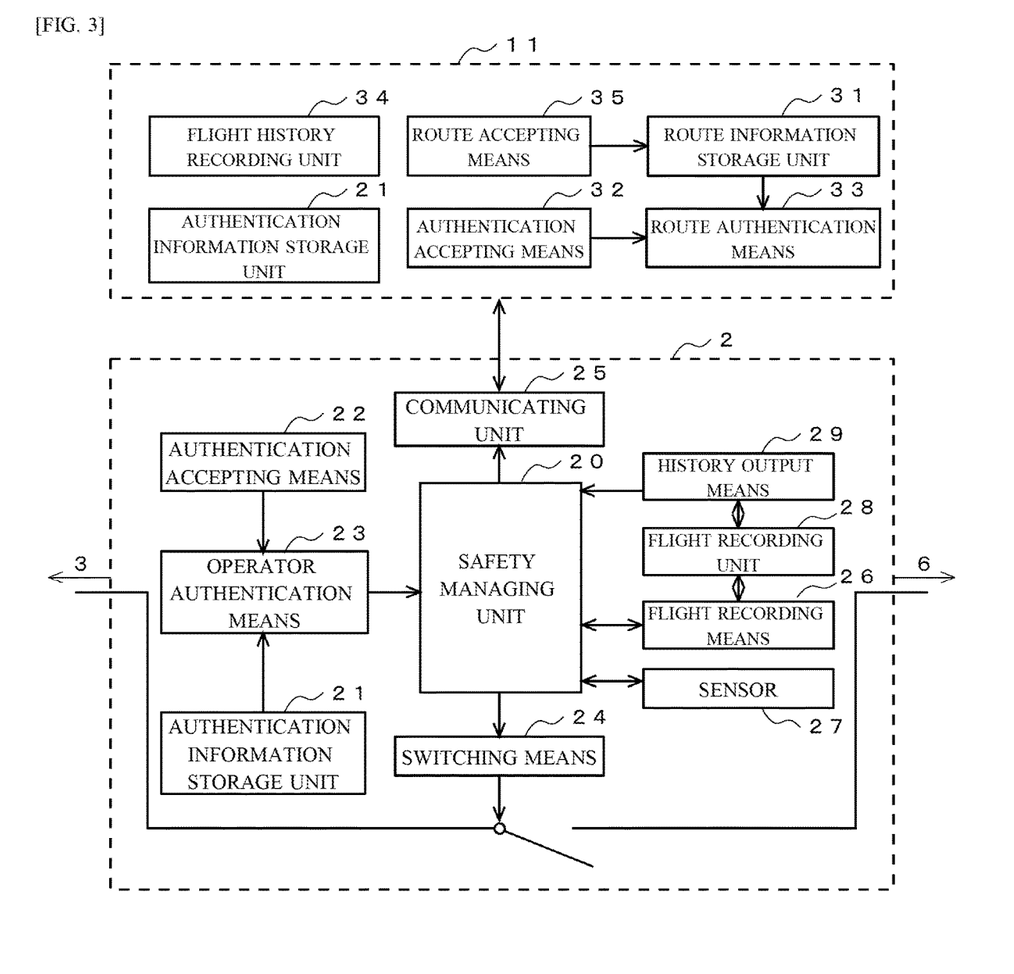
FIG. 3 is a functional block diagram of a safety management device according to one embodiment of the present invention.

FIG. 3 is a functional block diagram of the safety management device 2. The safety management device 2 includes a safety managing unit 20 for performing control in the safety management device 2, an authentication information storage unit 21 which stores registered identification information registered in advance for user authentication process, authentication accepting means 22 which accepts an input of input identification information from the authentication device 10, operator authentication means 23 which performs authentication of the input identification information and the registered identification information, switching means 24 which switches an electrical connection state between the battery 3 and the motor controller 6 based on the result of the authentication process, a communicating unit 25 for communicating with the management server 11 through a network, a sensor 27 for acquiring status information of the flying object 1, flight recording means 26 which records flight history information based on the status information measured by the sensor 27, a flight recording unit 28 which records the flight history information, and history output means 29 which outputs flight history information. The safety managing unit 20 is not necessarily required to be provided, and the entire or part of these structures to be used or processed by the safety managing unit 20 may be configured so as to be connected to the main control unit 4 or the like and/or executed by the main control unit 4 or the like.

Operator authentication is performed by the safety managing unit 20, the authentication information storage unit 21, the authentication accepting means 22, and the operator authentication means 23. Operator authentication is performed on the inputted input identification information by using the registered identification information registered in advance. As for the input identification information stored in the authentication device 10 and the registered identification information stored in the authentication information storage unit 21, data are not required to be stored in one-to-one relation. For example, information about a plurality of operators may be stored in one flying object 1 as registered identification information. Also, when information about a plurality of operators is stored as registered identification information, a flight enabled range of the flying object 1 and flight conditions such as a flight enabled time may be limited for each operator.

Other than the input identification information, the authentication device 10 may have a result of flight enabled/disabled authentication. Also, the operator authentication means 23 may be configured to be able to read information other than the input identification information to control the flight enabled/disabled state. The flight enabled/disabled authentication is an authentication process for applying for a permission when an operation signal is inputted from the operation terminal of the operator to make a flight of the flying object 1. Enabled/disabled authentication is performed depending on, for example, whether a flight region for application overlaps a flight region of another flying object 1 receiving the flight permission.

For example, the identification information about the operator is read from the authentication device 10 by the portable terminal including an IC and an IC reader for non-contact communication, and an application for flight permission for the flying object 1 is made from this portable terminal to the authentication server 11. Thus, the identification information about the operator and flight permission information (the result of flight enabled/disabled authentication) can be acquired in association with each other. These identification information and permission information can be inputted from the IC of the portable terminal or the like via the authentication accepting means 22. This allows control over the flight enabled/disabled state of the flying object 1 to be performed with two-step authentication by using the identification information about the operator and the flight permission information.

The safety managing unit 20 is connected by the communicating unit 25 to the management server 11 via the network. The management server 11 includes the authentication information storage unit 21, a route information storage unit 31 which stores the registered route information where an autonomous flight schedule has been registered in association with the identification information about the operator, authentication accepting means 32 which accepts an input of the input identification information from the safety management device 2, route authentication means 33 which performs a route authentication process, a flight history recording unit 34, and route accepting means 35 which accepts an input of input route information to register the autonomous flight schedule.

In the present embodiment, the authentication information storage unit 21 is provided also to the management server 11. With this, when communication through the network is enabled (hereinafter, at the time of online), operator authentication can be performed by receiving the registered identification information from the management server 11. On the other hand, when communication through the network is disabled (hereinafter, at the time of offline), operator authentication can be performed by using the registered identification information stored in the authentication information storage unit 21 included in the safety management device 2. A configuration may be adopted in which the flight conditions are limited depending on a difference in the authentication method between online and offline. A configuration may be adopted in which the authentication information storage unit 21 is provided to only either one of the safety management device 2 and the management server 11.

The route information storage unit 31 stores the registered route information where the autonomous flight schedule has been registered in association with the identification information about the operator. The route accepting unit 35 accepts, from a computer terminal connected to the network or the like, input route information for registering the autonomous flight schedule and performs a registration process. The input route information accepted by the route accepting means 35 is inputted in association with the identification information about the operator.

The route information has information regarding an autonomous flight, for example, a date and time when the autonomous flight is to be performed, a flight altitude at the time of flight, a starting point, a target point, and a relay point from the starting point to the target point. Note that, as for the date and time when the autonomous flight is to be performed, it is practically difficult to start an autonomous flight exactly at the specified time. Thus, the time when the autonomous flight is to be performed is preferably registered as a predetermined time interval, such as in units of thirty minutes.

The input route information can be preferably inputted on an accessible web page from the computer terminal or the like by using a web browser for a registration process. As for input of the starting point, the relay point, the target point, and so forth for the autonomous flight, it is preferable that the position of a pointer inputted on a map can be acquired by geocoding. Also, a configuration may be preferable in which, when a flight route is inputted, a flight prohibited area determined in advance and so forth are displayed on a map and registration of a location in the flight prohibited area as a flight route is disabled.

The input route information is compared with the registered route information already stored in the route information storage unit 31 for a registration process. The registration process is performed in view of, for example, whether there is a possibility of occurrence of an accident in consideration of the already-registered registered route information. If determined as registerable, the input route information is stored in the route information storage unit 31 as registered route information in association with the identification information about the operator. If there is another already-registered registered route information and an autonomous flight based on the input route information as a registration process target cannot be permitted, this registration is rejected. In that case, a configuration to suggest an alternative flight route may be adopted.

The authentication accepting means 32 accepts the input identification information from the safety management device 2, and forwards the information to the route authentication means 33. Based on the input identification information, the route authentication means 33 derives the registered route information from the route information storage unit 31 to perform a route authentication process (enabled/disabled authentication) for an autonomous flight. If the registered start time has elapsed before a time when an autonomous flight is started or an accident or the like has occurred in the area registered on the flight route or in the case of inclement weather or the like, a configuration can be adopted in which the autonomous flight on the registered route is rejected. With this route authentication process, as for the registered route information, an actual autonomous flight start time and whether the autonomous flight has actually started can be detected.

Also, a configuration may be adopted in which position information about a location of the flying object 1 is acquired by the sensor 27 for output, together with the input identification information. With this, whether the flying object 1 is present near the starting point registered as the registered route information can be determined to perform autonomous flight enabled/disabled authentication.

The switching means 24 switches an electrical connection state between the battery 3 and the motor controller 6 based on at least one of authentication results of operator authentication by the operator authentication means 23 and autonomous flight enabled/disabled authentication by the route authentication means 33. This switches between a state in which the flying object 1 cannot flight physically (a state in which electric power is not supplied to the servo motors 5) and a flight-enabled state. Also, a configuration may be adopted in which the flight enabled/disabled state is switched based on the result of flight enabled/disabled authentication.

Also, additionally, a configuration may be adopted in which whether another flying object 1 is present nearby is detected and the switching means 24 is operated on a predetermined condition such that another flying object is flying near the flying object 1 to control the flight enabled/disabled state. With the communicating unit 25 of the flying object 1 having mounted thereon short-distance or middle-distance wireless communication means such as Bluetooth (registered trademark) and a flying object signal being emitted at a predetermined frequency and with a predetermined radio field intensity, the flying object 1 emitting the flying object signal can be detected from another flying object 1. The flying object 1 may be configured to emit a flying object signal only during flying, thereby allowing the flying object 1 flying nearby to be detected.

The flight recording means 26 generates flight history information at the time of a flight of the flying object 1. The generated flight history information is recorded on the flight recording unit 28. The flight history information has at least the status information about the flying object 1 detected by using the sensor 27, and may have further information acquired by operator authentication performed before the flight, and so forth. The flight recording means 26 may be configured to further store, as flight history information, an operation signal from the main control unit 4 to the motor controller 6, the telemetry communicating unit 8, and so forth, an operation signal from the wireless receiver 7 to the main control unit 4, and so forth. This flight history information is outputted by using the history output means 29. An output can be performed by a method from the communicating unit 25 to the management server 11 via the network or by a method of extracting by the operator or the like. Regarding the output timing, a configuration may be adopted in which the flight history information regarding the flight made this time is outputted after the flight or the flight history information regarding the flight previously made is outputted at the time of operator authentication by the operator authentication means 23 before the flight. The flight history information outputted to the management server 11 via the network is recorded on the flight history recording unit 34. When the operator extracts the flight history information via the history output means 29, a configuration may be adopted in which an operator authentication process is performed in advance. Also, to prevent erasure or manipulation, the history information may be encrypted for storage and output. For example, a configuration may be adopted in which a structure which encrypts information may be provided to the flight recording means 26 to encrypt the flight history information for recording on the flight recording unit 28.

Figure 4:
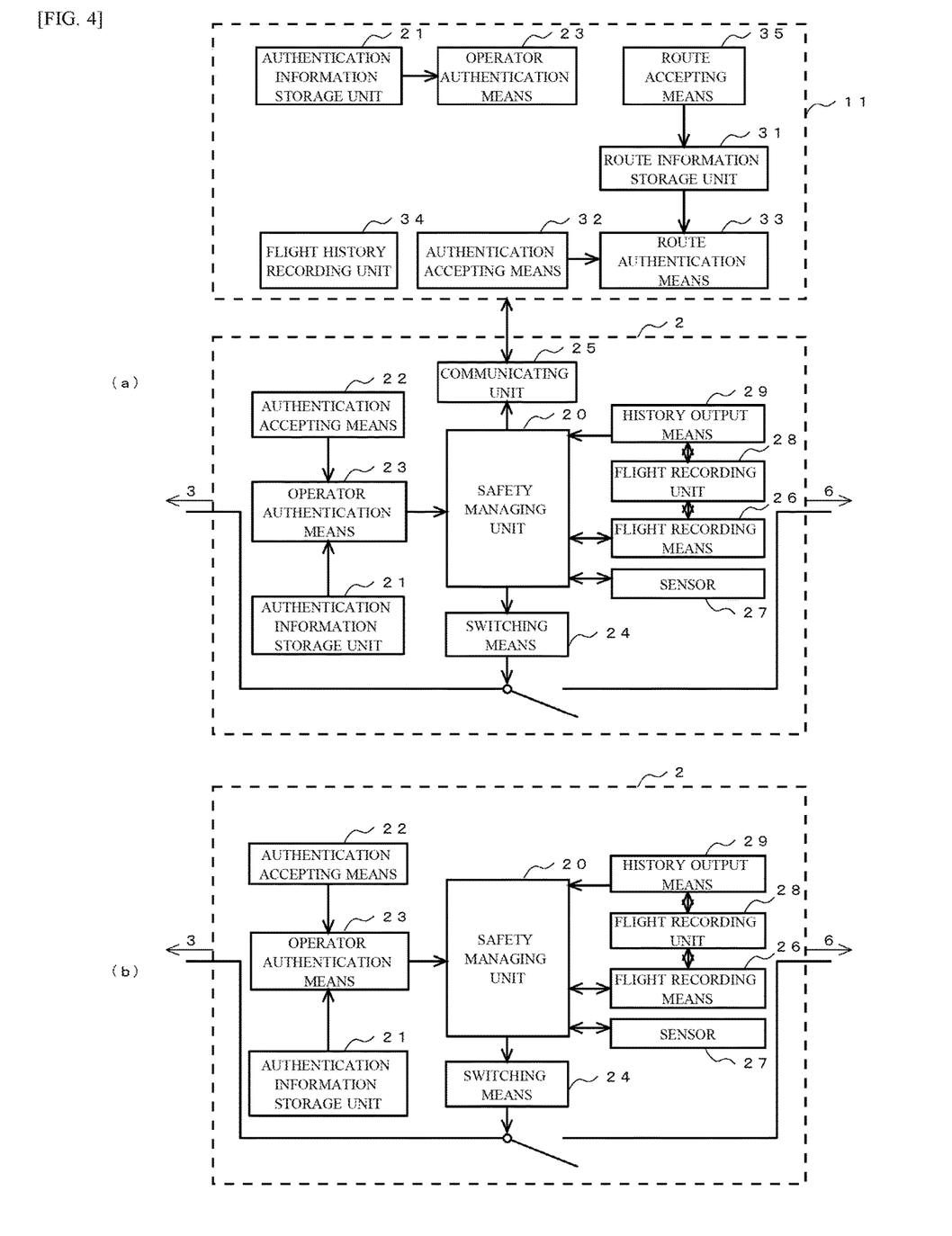
FIG. 4 depicts an example of another structure of the safety management device according to one embodiment of the present invention.

Note that, as depicted in FIG. 4(*a*), a configuration may be adopted in which the operator authentication means 23 is also provided to the management server 11 to perform operator authentication at the management server 11 at the time of online and operator authentication is performed on the safety management device 2 side at the time of offline. Also, the operator authentication means 23 may be provided only to the management server 11 and authentication may be performed online only. Furthermore, a configuration may be adopted in which two-step authentication is performed by using the registered identification information and the operator authentication means on both of the flying object 1 side and the management server 11 side. Also as depicted in FIG. 4(*b*), a configuration may be adopted in which operation is performed offline only without providing the communicating unit 22 to the safety management device 2. A configuration may be adopted in which a restriction is provided to the flight conditions depending on a difference among these authentication processes.

Figure 5:
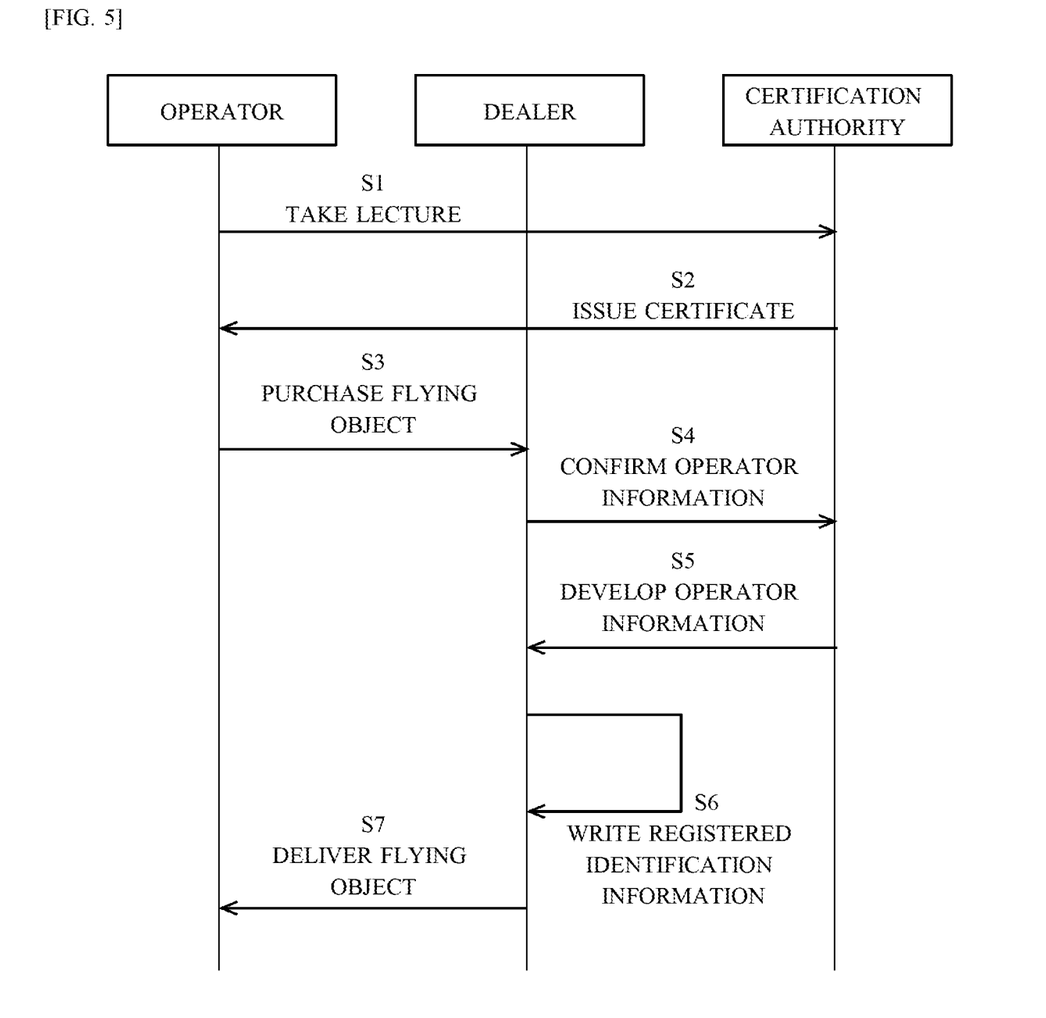
FIG. 5 is a diagram depicting a flow regarding a process of linking registered identification information according to one embodiment of the present invention.

A flow of linking the identification information to the operator is described by using FIG. 5. Note that while a case is exemplarily described in the present embodiment in which the operator takes an operation seminar for the flying object 1 and a certificate (authentication device 10) is issued, for example, a case may be such that an inspection is performed as to whether the flying object 1 complies with maintenance standards and a certificate is supplied/updated as a proof that the inspection result falls within the standards.

The operator takes an operation seminar for the flying object 1 at the certification authority (S1). For the operator taking the seminar, a certificate (authentication device 10) is issued from the certification authority (S2). On this certificate, identification information linked to the operator is recorded, and this identification information is used as input identification information. The operator carries this certificate or a certificate number or the like to visit a dealer of the flying object 1 to purchase the flying object (S3). At the dealer, based on the certificate or the certificate number or the like, an inquiry about information about the operator is made (S4).

If the information about the operator has been confirmed, the information about the operator is acquired at a store terminal (S5). Then, based on the acquired information about the operator, the registered identification information is recorded on the authentication information storage unit 21 of the flying object 1 (S6). Then, the flying object 1 is delivered to the operator (S7). This causes the registered identification information to be recorded on the authentication information storage unit 21 of the flying object 1, allowing control over the flight enabled/disabled state of the flying object 1 by using the authentication device 10.

Figure 6:
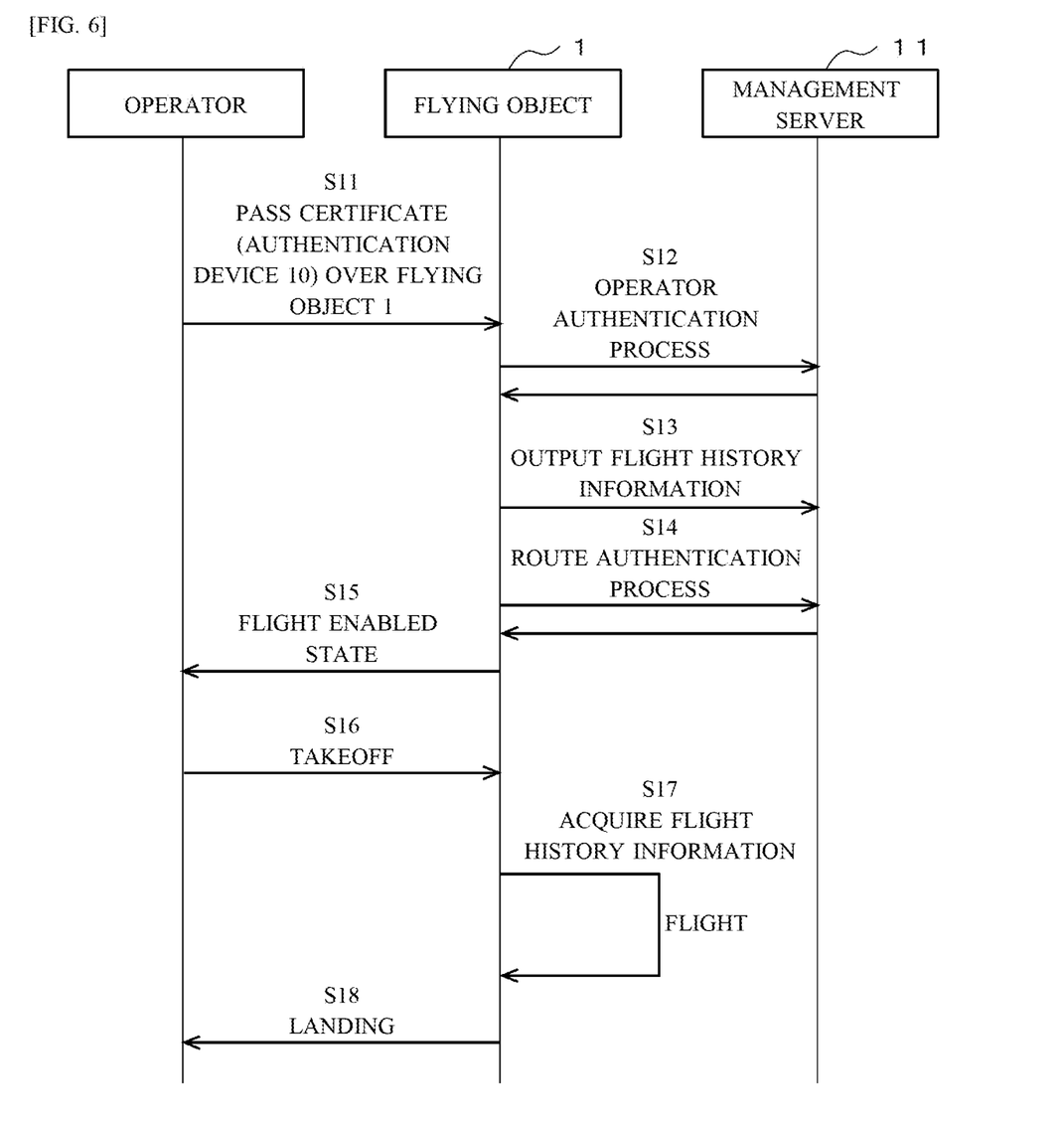
FIG. 6 is a diagram depicting a flow regarding an authentication process according to one embodiment of the present invention.

Next, a process flow of the flight enabled/disabled control over the flying object 1 is described by using FIG. 6. The operator passes the authentication device 10 over the flying object 1 (S11). The safety management device 2 acquiring the input identification information from the authentication device 10 performs operator authentication (S12).

Here, at the time of online, the registered identification information is acquired from the management server 11 for operator authentication. On the other hand, at the time of offline, the registered identification information is acquired from the authentication information storage unit 21 of the flying object 1 for operator authentication. At the time of online, if the operator authentication process at S12 is successful, the flight history information is outputted (S13). At the time of offline, if the operator authentication process is successful, the process proceeds to S15 to cause a flight enabled state.

At S13, the flight history information stored in the flight recording unit 28 and not outputted so far is outputted to the management server 11. The management server 11 receiving the flight history information records the flight history information on the flight history recording unit 34. Here, a configuration may be adopted in which the output-completed flight history information is erased from the flight recording unit 28. A configuration may be adopted in which, at the time of offline, the operator extracts the flight history information and outputs the flight history information from another computer terminal or the like to the flight history recording unit 34.

When an autonomous flight is made, a route authentication process is performed next (S14). When an autonomous flight is not made, the process proceeds to S15 to cause a flight enabled state. Here, as the input identification information for use in the route authentication process, one at the time of the operator authentication process at S12 may be used. Also, the route authentication process is not required to be performed after the flight history information output process at S13, and may be performed before the output process or the like. If the route authentication process is successful, the flying object 1 becomes in a flight enabled state (S15). From a time when the flying object 1 takes off (S16) to a time when it lands (S18), new flight history information regarding this flight is recorded on the flight recording unit 28 (S17).

Figure 7:
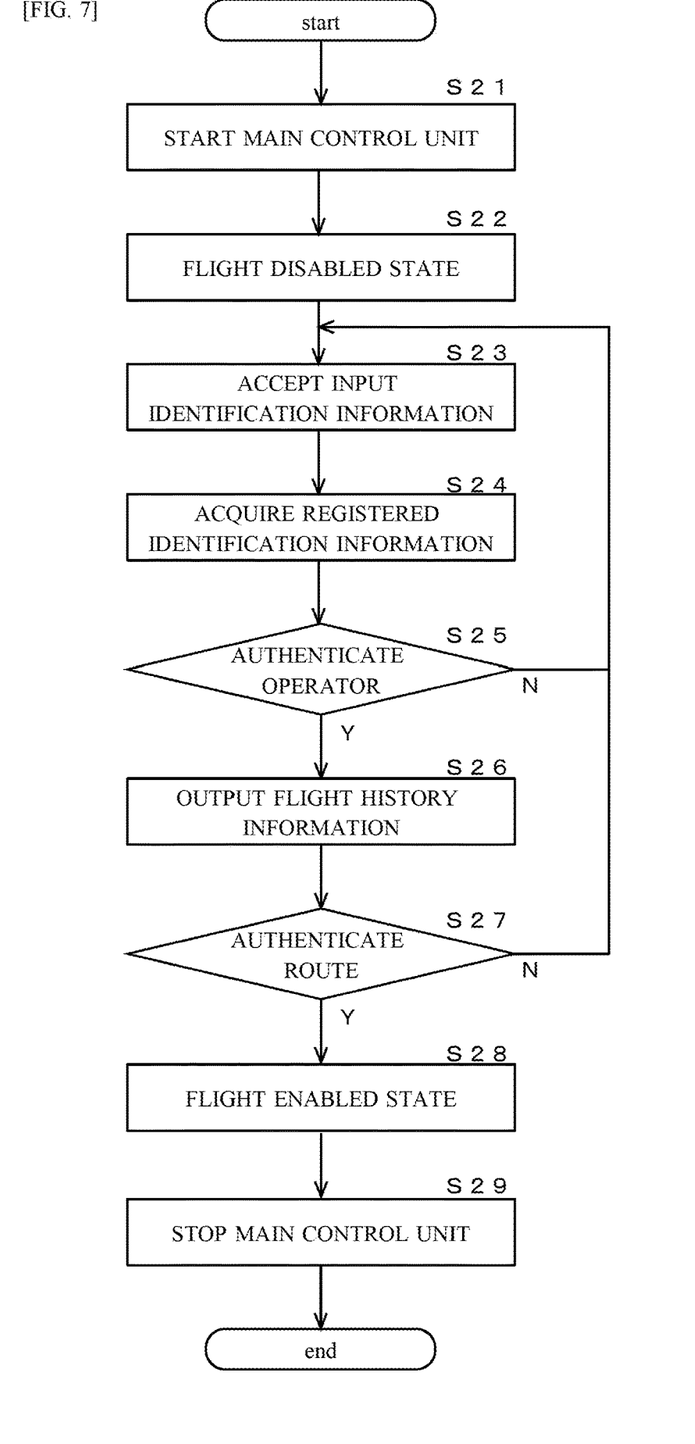
FIG. 7 is a flowchart regarding transitions of a flight enabled/disabled state according to one embodiment of the present invention.

Next, a process flow regarding control over the flight enabled/disabled state of the flying object 1 is described by using FIG. 7. In the present embodiment, when the main control unit 4 becomes in a stop state, an electrical connection between the battery 3 and the motor controller 6 makes a transition to an invalid state.

At S21, the main control unit 4 is started. This causes a state in which the function of the main control unit 4 and so forth can be used, although electric power is not fed to the servo motors 5 (S22). At S23, the input identification information is inputted to the authentication accepting means 22. In the present embodiment, the authentication accepting means 22 is an IC reader. With the authentication device 10 owned by the operator undergoing non-contact wireless communication, the input identification information is inputted.

With the configuration in which the authentication device 10 is accepted via non-contact wireless communication, it is possible to easily accept an input of the input identification information. Also, a physical structure such as a socket, key, or the like for accepting an input is not required to be provided in a form of being exposed to the flying object main body. By adjusting an output from the IC reader, the authentication accepting means 22 or the safety management device 2 having the authentication accepting means 22 can be arranged at a free position in the flying object. Thus, the flexibility of the arrangement position of the authentication accepting means 22 is increased. Also, when the safety management device 2 has the authentication accepting means 22, the flexibility of the arrangement position of the authentication accepting means 22 inside the safety management device 2 is increased.

When the input identification information is inputted at S23, the operator authentication means 23 calls the registered identification information stored in advance in the authentication information storage unit 21 (S24). When the input identification information and the registered identification information are both provided, operator authentication is performed (S25). When operator authentication fails (N at S25), the process returns to S23, and an electrical-connection-invalid state between the battery 3 and the motor controller 6 is kept.

When operator authentication is successful (Y at S25), the flight history information recorded on the flight recording unit 28 is outputted to the management server 11 (S26). In the present embodiment, a configuration is adopted in which the flight history information recorded on the flight recording unit 28 is outputted at the time of an operator authentication process before flight or after flight. A configuration may be adopted in which the flight history information recorded on the flight recording unit 28 is outputted after flight to the management server 11. If output of the flight history information is completed, a route authentication process for making an autonomous flight is performed (S27). If route authentication fails (N at S27), the process returns to S23, and an electrical-connection-invalid state between the battery 3 and the motor controller 6 is kept. If route authentication fails, a configuration may be adopted in which only the operation based on the operation signal inputted by the operation terminal is permitted to cause a flight-enabled state.

If route authentication is successful (Y at S27), the connection state between the battery 3 and the motor controller 6 is switched to validate the electrical connection state (S28). This allows a motor control instruction from the main control unit 4 to the motor controller 6 to be reflected onto the servo motors 5 to enable a flight of the flying object 1. Also in the present embodiment, power feed to the main control unit 4 is stopped and if its function stops (S29), the flying object 1 is returned to be in a flight-disabled state.

By the present embodiment, the flight enabled/disabled state of the flying object 1 can be easily switched. Also, with the safety management device 2 interposed between the battery 3 and the motor controller 6, the electric connection state to the servo motors 5 can be physically changed to control its flight enabled/disabled state. By controlling a flight in the servo motors 5, another process performed by the main control unit 4 can be performed also before operator authentication. Also, by performing a route authentication process, it is possible to prevent an accident at the time of autonomous flight.

Also, with the flight history information outputted to the management server 11, malicious use by the operator himself or herself can be deterred. Furthermore, with recording of the flight history information and operator authentication being both performed, the operator and its flight history information can be linked for management and operation. This makes it possible to, for example, determine based on the flight history information whether an accident of the flying object at a certain time is due to the operation of the operator, maintenance failure, or the like or due to a contingent factor.

REFERENCE SIGNS LIST

1 flying object
10 authentication device
11 management server
12 wing part
13 leg part
2 safety management device
20 safety managing unit
21 authentication information storage unit
22 authentication accepting means
23 operator authentication means
24 switching means
25 communicating unit
26 flight recording means
27 sensor
28 flight recording unit
29 history output means
31 route information storage unit
32 authentication accepting means
33 route authentication means
34 flight history recording unit
35 route accepting means
3 battery
4 main control unit
5 servo motor
6 motor controller
7 receiving unit
8 telemetry communicating unit
9 measurement device

The invention claimed is:

1. A safety management system for a flying object, where the flying object includes a motor controller, a plurality of servo motors connected to the motor controller, and a main control unit connected to the motor controller, the safety management system comprising:
a power source included with the flying object, the power source is connected to the main control unit;
a management server separate from the flying object, the management server includes a processer and a memory;
a safety management device included with the flying object, the safety management device is separate from the main control unit and is interconnected between the power source and the motor controller; the safety management device includes a safety managing unit, a memory, a communicating unit for communicating with the management server via a network, an integrated circuit (IC) reader for non-contact communication and a switch;

the switch is disposed on an electrical power path between the power source and the motor controller, the switch has a connected state where electrical power is permitted to flow on the electrical power path from the power source to the motor controller via the safety management device and a disconnected state where electrical power is not permitted to flow on the electrical power path from the power source to the motor controller via the safety management device;

the safety managing unit is connected to the switch and controls the switch between the connected state and the disconnected state based on a result of an operator authentication operation;

the safety management device is configured to record flight history information of the flying object during flight in the memory of the safety management device;

the safety management device is configured to obtain input identification information from an authentication device via the IC reader;

the safety management device includes an offline configuration where the safety management device is configured to perform an operator authentication operation based on the input identification information and registration identification information stored in the memory of the safety management device;

the safety management device further includes an online configuration where: a) the safety management device is configured to perform an operator authentication operation based on input identification information and registration identification information received from the management server; or b) the processor of the management server is configured to perform an operator authentication operation based on input identification information and registration identification information stored in the memory of the management server and the management server sends the results of the operator authentication operation to the safety management device; and wherein the switch is in the disconnected state when the main control unit is in a stopped state, the switch is maintained in the disconnected state when the main control unit is started from the stopped state, the switch is maintained in the disconnected state after an unsuccessful operator authentication operation, and the switch is switched to the connected state after a successful operator authentication operation, and in the online configuration, the safety management device is configured to output the flight history information stored in the memory of the safety management device to the management server via the network upon a successful operator authentication operation.

2. The safety management system according to claim 1, wherein the memory of the management server is configured to store registered route information on which an autonomous flight schedule of the flying object is registered, the processor of the management server is configured to perform autonomous flight enabled/disabled authentication based at least partly on the the registered route information.

3. A non-transitory computer readable medium disposed on a flying object that includes a motor controller, a plurality of servo motors connected to the motor controller, and a main control unit connected to the motor controller, and the flying object having recorded thereon a safety management program for the flying object, the safety management program performing flight control of the flying object by changing power fed to the plurality of servo motors using the motor controller based on an instruction from the main control unit, the safety management program when executed causing the flying object to:

perform an operator authentication operation based on stored identification information and input identification information;

control the flow of electrical power from a power source on the flying object to the motor controller using a safety management device on the flying object that is separate from the main control unit and that is interconnected between the power source and the motor controller, wherein the safety management device includes a safety managing unit, a memory, a communicating unit for communicating with a management server via a network, an integrated circuit (IC) reader for non-contact communication, and a switch that is disposed on an electrical power path between the power source and the motor controller, the switch has a connected state where electrical power is permitted to flow on the electrical power path from the power source to the motor controller via the safety management device and a disconnected state where electrical power is not permitted to flow on the electrical power path from the power source to the motor controller via the safety management device, and the safety managing unit is connected to the switch and controls the switch between the connected state and the disconnected state based on a result of the operator authentication operation;

cause the safety management device to record flight history information of the flying object during flight in the memory of the safety management device;

cause the safety management device to obtain the input identification information from an authentication device via the IC reader;

cause the safety management device to implement an offline configuration where the safety management device performs the operator authentication operation based on the input identification information and the stored identification information stored in the memory of the safety management device;

cause the safety management device to implement an online configuration where: a) the safety management device perform an operator authentication operation based on input identification information and registration identification information received from the management server; orb) a processor of the management server is configured to perform an operator authentication operation based on input identification information and registration identification information stored in a memory of the management server and the management server sends the results of the operator authentication operation to the safety management device;

wherein the switch is in the disconnected state when the main control unit is in a stopped state, the switch is maintained in the disconnected state when the main control unit is started from the stopped state, the switch is maintained in the disconnected state if the operator authentication operation is unsuccessful, and the switch is switched to the connected state if the operator authentication operation is successful;

in the online configuration, the safety management device outputs the flight history information stored in the memory of the safety management device to the management server via the network upon a successful operator authentication operation.

4. A safety management method for a flying object that includes a motor controller, a plurality of servo motors connected to the motor controller, and a main control unit connected to the motor controller, the safety management method performs flight control of the flying object by changing power fed to the plurality of servo motors using the motor controller based on an instruction from the main control unit, the safety management method comprising:

performing an operator authentication operation based on stored identification information and input identification information;

using a safety management device on the flying object that is separate from the main control unit and that is interconnected between a power source on the flying object and the motor controller to control the flow of electrical power to the motor controller, wherein the safety management device includes a safety managing unit, a memory, a communicating unit for communicating with a management server via a network, an integrated circuit (IC) reader for non-contact communication, and a switch that is disposed on an electrical power path between the power source and the motor controller, the switch has a connected state where electrical power is permitted to flow on the electrical power path from the power source to the motor controller via the safety management device and a disconnected state where electrical power is not permitted to flow on the electrical power path from the power source to the motor controller via the safety management device, and the safety managing unit is connected to the switch and controls the switch between the connected state and the disconnected state based on a result of the operator authentication operation;

using the safety management device to record flight history information of the flying object during flight in the memory of the safety management device;

using the safety management device to obtain the input identification information from an authentication device via the IC reader;

using the safety management device to implement an offline configuration where the safety management device performs the operator authentication operation based on the input identification information and the stored identification information stored in the memory of the safety management device;

using the safety management device to implement an online configuration where: a) the safety management device perform an operator authentication operation based on input identification information and registration identification information received from the management server; or b) a processer of the management server is configured to perform an operator authentication operation based on input identification information and registration identification information stored in a memory of the management server and the management server sends the results of the operator authentication operation to the safety management device;

wherein the switch is in the disconnected state when the main control unit is in a stopped state, the switch is maintained in the disconnected state when the main control unit is started from the stopped state, the switch is maintained in the disconnected state if the authentication operation is unsuccessful, and the switch is switched to the connected state if the authentication operation is successful; and in the online configuration, the safety management device outputs the flight history information stored in the memory of the safety management device to the management server via the network upon a successful operator authentication operation.

* * * * *